Patented June 15, 1926.

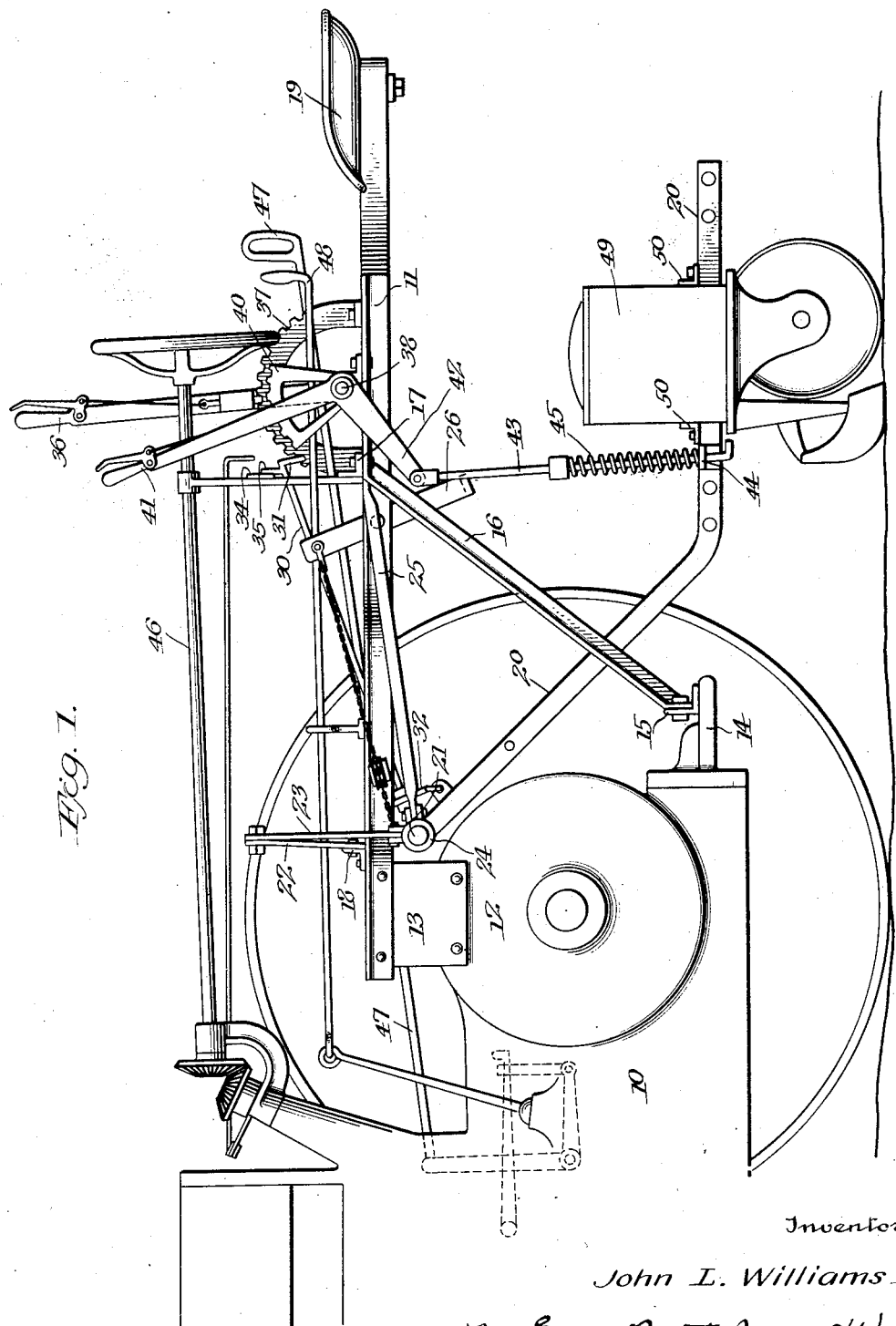

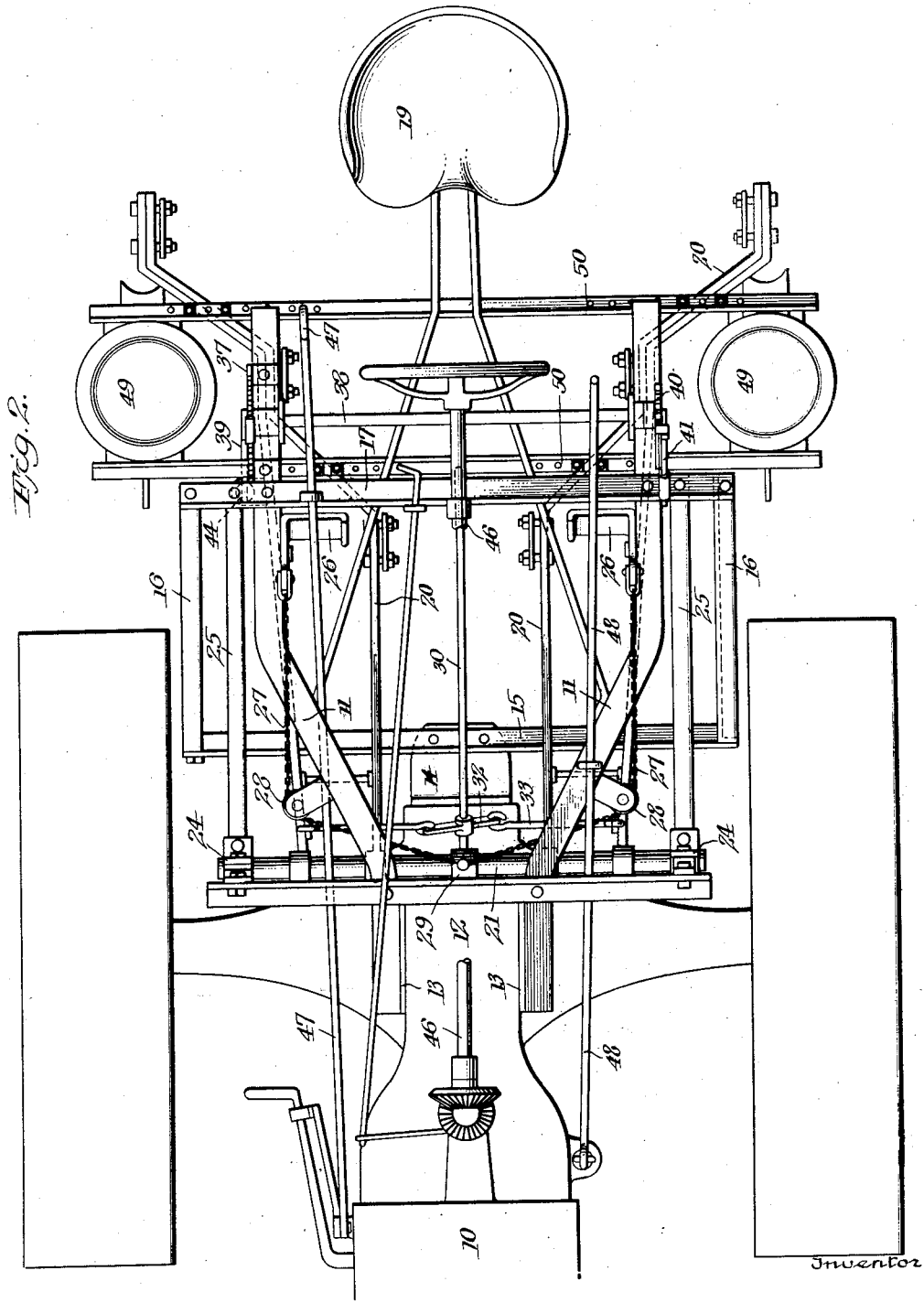

1,589,278

UNITED STATES PATENT OFFICE.

JOHN L. WILLIAMS, OF JACKSON, TENNESSEE, ASSIGNOR TO SOUTHERN STEEL PRODUCTS COMPANY, OF JACKSON, TENNESSEE, A CORPORATION OF TENNESSEE.

CULTIVATOR ATTACHMENT FOR TRACTORS AND THE LIKE.

Application filed November 11, 1925. Serial No. 68,409.

My invention aims to provide an improved farm implement that is easily applicable to motor driven tractors and the like, and that can readily be operated by the operator of the tractor.

In the accompanying drawings, wherein I have shown one embodiment of my invention:

Figure 1 is a fragmentary side elevation, partly in section, showing my invention applied to the rear end of a tractor; and Figure 2 is a top plan view of the construction shown in Figure 1.

Referring more specifically to the particular embodiment of my invention selected for purposes of illustration and shown in the drawings, my improvement comprises an implement shown as a riding cultivator, having provision for securing suitable implements thereon such as planters, etc., (see Figure 1), and is secured upon the rear end of a well-known type of farm tractor 10, shown more or less in conventional form.

I provide a suitable supporting framework, here shown as comprising horizontal main frame members made of angle iron or other convenient material, and projecting rearwardly from the rear end of the tractor 10. Referring to both Figs. 1 and 2, these frame members 11, preferably two in number, are secured to the top of the differential housing 12 of the tractor or other convenient point of support, by means of a pair of brackets 13, suitably bolted or otherwise secured to the housing. At the lower rear end of the differential housing 12, I have shown the usual tractor draw-bar 14 projecting rearwardly therefrom and affording provision for supporting the rear end of the frame by struts or other suitable means. A transverse angle iron 15 is secured to the draw-bar 14, and the ends of the side struts 16 are separably bolted thereto and to the frame at opposite sides, forming a rigid cantilevered structure overhanging the rear of the tractor.

At the rear end of the frame (see Figure 1) I may provide a transverse bar 17 extending across and connecting the frame members 11, and forming a brace for these members as well as convenient means for securing the side struts 16. At the forward end of the frame there is also preferably secured a transverse bar 18, which may be an angle bar or other suitable shape, for supporting the cultivator gangs and gang bar. A suitable driver's seat 19 is rigidly secured to the framework, and projects rearwardly therefrom so as to afford the driver an opportunity to observe the operation of the implement without turning around or interfering with his operating the control mechanism hereinafter described.

The type of implement shown in the drawings has gang beams 20 preferably slidably or loosely secured to a gang draw-bar 21 which is suspended for swinging movement in a plane transverse to the line of travel of the machine. The working tools, for example, cultivator teeth or blades, may be clamped to the gang-bars at suitably spaced intervals. Mounted on the front frame cross-bar 18 are supports 22 (see Fig. 1) to which are pivoted swinging bars 23 having at their lower ends pivot connections with collars 24 arranged near the opposite ends of the gang draw-bar 21. This arrangement permits the gang draw-bar 21 to swing transversely of the machine and shift the gangs without necessitating changing the course of the tractor. Also pivoted to the collars 24 are thrust rods 25 having their rear ends pivotally connected to the cross-bar 15. These bars support the gang draw-bar against the horizontal thrust exerted by the gangs during their operation.

To provide convenient mechanism for controlling the transverse movement of the gangs with respect to the line of travel of the machine, I have here shown (see Figs. 1 and 2) a pair of foot treadles 26 pivoted to the frame members 11, within easy reach of the operator and connected with the gang draw-bar 21 by means of a pair of flexible cables or chains 27, trained over pulleys 28 and secured to a fixed collar 29 on the gang draw-bar. This arrangement is such that pressure exerted on one or the other of the treadles will swing the gang draw-bar in the desired direction.

As a further means for controlling the movement of the gangs, particularly for the purpose of bringing them closer together or further apart as is necessary in some instances, for example, where rows are spaced different widths apart, I have provided a gang-spreading device. This control comprises (see Fig. 1) a rod 30 pivotally mounted in an ear on the collar 29 and having at its rear end within reach of the driver's seat a crank handle 31. On the rod 30 I have shown rocker arms 32 to which are pivoted rigid links 33 connected to the gang beams in such a manner as to shift them on the gang draw-bar 21 either toward each other or away from each other as the crank handle 31 is turned. To hold the crank handle and the gang beams in properly adjusted positions I have here shown a locking segment 34 with which a projection 35 on the rod 30 cooperates to lock the bar or rod in any desired adjusted position within its limit of adjustment.

I have also provided a convenient means for raising and lowering the gangs to inoperative or operative position at will, which comprises a master ratchet lever 36 cooperating with a segment 37 mounted on the frame 11. This mechanism is connected to a shaft 38 extending across the frame to which, in turn, are secured suitable adjustable means for controlling the gangs individually. For example, a lever arm 39 may be secured to the lever 36 or to the shaft 38 adjacent thereto, and a flexible connection between its end and the corresponding gang holds the gang beam in raised or lowered position. At the end of the shaft 38 remote from the master lever 36 is a segment 40 fixed to the shaft above the corresponding gang, and cooperating with this segment is a ratchet lever 41 loosely mounted on the shaft. An arm 42 is provided on the lever, forming a bell crank, to which is loosely pivoted a rigid arm 43, having its end slidably secured to a lug 44 on the gang. Compression springs 45, normally acting to press the gangs downwardly but permitting them to rise upon striking obstructions, may be supplied for protecting the gangs and the gang controlling devices from shock. The pivoted connections between the crank 39 and arms 42 and the rods 43 are sufficiently loose to permit universal movement in order not to interfere with the desired adjustments of the gangs. By means of the mechanism just described, both of the gangs can be lifted and lowered simultaneously and their relative height adjusted. This is particularly desirable on uneven ground.

In order to eliminate the necessity for a driver for the tractor and another operator for the cultivator I have provided control means for the tractor accessible from the driver's seat on the cultivator. In the device illustrated, the main steering wheel 46 is mounted on a suitable bracket and geared to the steering shaft, and a clutch control lever 47 and gear shifting lever 48 are also provided, all within easy reach of the operator.

In the illustrative example of my invention shown in the drawings, planters 49 are secured detachably to each of the gang beams in spaced relation according to the width of the rows to be planted. In this instance there is no necessity for making separate adjustments of the gangs further apart or closer together as it is desired that the rows shall be the same distance apart. The means for securing the planters in place on the gang beams comprise angle bars 50 adapted to be secured in any one of a number of adjusted positions upon the gangs and to the planters. Of course there is a provision for removing the usual cultivator standards which are customarily clamped to the gang beams by V-bolts.

In accordance with my invention, I am enabled to lower or to lift a plurality of planters to operative or inoperative position and to make all necessary adjustments while the tractor is in motion without depending entirely upon the direction of travel of the tractor. Moreover my arrangement of suspension and thrust rods or links for the gang draw-bar is such that the gangs may easily be shifted laterally to dodge plants or obstructions, because the unbalanced force on the vertical links when shifted to the right or left, which tends to restore the draw-bar to its normal position, is counteracted to a large extent by the unbalanced force on the thrust links acting in the opposite direction. These are some of the important characteristics of my invention.

My improved cultivator, whether or not it is attached to a motor propelled tractor or a horse-drawn vehicle, is susceptible of easy control and manipulation and is eminently fitted for use on more or less rough ground where flexibility is desired. Furthermore, my improved mechanism is adapted to be manufactured as a unit independent of the vehicle, and can easily be attached to an ordinary tractor by an unskilled workman.

The term "cultivator or cultivating" attachment, as herein used, is not intended to limit the use of applicant's invention to the cultivation of growing plants.

Obviously, my invention is susceptible of various changes.

Having thus described one illustrative embodiment of my invention without limiting myself thereto, what I claim and desire to secure by Letters Patent is:

1. A cultivator attachment for tractors and the like, comprising in combination a rigid framework removably attached to the tractor and extending rearwardly of the rear axle housing thereof, a gang drawbar suspended from the framework for transverse swinging movement, a pair of gangs slidably mounted upon said swinging drawbar, means for adjusting the gangs upon said gang draw-bar and maintaining said gangs in the desired position, means for controlling the swinging movement of the said gang draw-bar and means for raising and lowering the gangs.

2. A cultivator attachment for tractors and the like comprising in combination a frame secured rigidly to the differential housing of the tractor and extending rearwardly of the rear axle housing thereof, bracing means connected to the rear end of the tractor to brace the frame, means on the frame for suspending a gang draw-bar for swinging movement, gangs pivotally mounted on the draw-bar, and means for raising and lowering the gangs.

3. A cultivator attachment for tractors and the like comprising in combination a substantially rigid framework removably secured to the tractor and extending rearwardly of the differential housing thereof, a gang draw-bar suspended from the framework for transverse swinging movement, a pair of gangs pivotally mounted upon said draw-bar, foot operated means for controlling the transverse swinging movement of said swinging draw-bar, means for raising and lowering the gangs simultaneously including a ratchet lever and shaft operably connected to the gangs, and a ratchet and lever on said shaft for raising and lowering one of the gangs independently of the other.

4. In a cultivator attachment for tractors and the like comprising in combination a supporting frame, a gang draw-bar pivotally mounted on the frame, for transverse swinging movement, a pair of substantially horizontal thrust rods or bars pivotally connected to said draw-bar and to the frame, a plurality of gangs pivotally connected to said draw-bar, and means for raising or lowering said gangs either simultaneously or independently with respect to each other.

5. A cultivating attachment for tractors and the like comprising, in combination, a horizontal frame rigidly secured at its forward end to the differential housing of the tractor, a plurality of diagonal braces for the frame, a cross member rigidly secured to the lower part of the tractor to which said braces are rigidly connected, and cultivator gangs supported by said frame.

6. A cultivating attachment for tractors and the like comprising, in combination, a frame rigidly secured at its forward end to the tractor, a gang drawbar supported for swinging movement by the frame, the supports for said drawbar including a pair of vertical links or substantially vertical arms and a pair of substantially horizontal arms pivotally connected to the frame and to the gang drawbar, the outer ends of the horizontal links or arms being pivotally connected to the frame in the rear of said draw-bar, the connection between said links or arms and said drawbar including an angle yoke, and cultivator beams carried by said drawbar.

7. A cultivating attachment for tractors and the like comprising, in combination, a horizontal frame rigidly secured at its forward end to the top of the differential housing of the tractor, rigid braces connected to the frame near its rear end and to the rear end of the tractor, a laterally swinging drawbar suspended from the frame, swinging supporting arms and pivotal thrust arms for said drawbar and a pair of cultivator beams mounted on said drawbar.

8. An attachment for tractors and the like comprising, in combination, a frame rigidly secured to the rear end of the tractor, a drawbar, a pair of gangs mounted on the drawbar, and means for suspending said drawbar and gang as a unit from said frame for lateral swinging movements comprising pivoted suspension links and laterally swinging thrust links so arranged that, when the gangs are shifted laterally, the force tending to restore the suspension links to normal position is substantially counterbalanced by the force tending to move the thrust links away from the normal position.

In testimony whereof, I have signed my name to this specification.

JOHN L. WILLIAMS.